United States Patent
Stoltze et al.

(10) Patent No.: US 11,565,742 B2
(45) Date of Patent: Jan. 31, 2023

(54) METHOD AND STEERING CONTROL APPARATUS FOR DETERMINING A CORRECTING VARIABLE FOR ADJUSTING SERVO STEERING TORQUE IN A VEHICLE STEERING SYSTEM

(71) Applicant: Volkswagen Aktiengesellschaft, Wolfsburg (DE)

(72) Inventors: Lars Stoltze, Lehre (DE); Alexander Bartels, Braunschweig (DE); Martin Sachwitz, Braunschweig (DE); Hendrik Fricke, Liebenburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 346 days.

(21) Appl. No.: 16/872,822

(22) Filed: May 12, 2020

(65) Prior Publication Data

US 2020/0361526 A1 Nov. 19, 2020

(30) Foreign Application Priority Data

May 14, 2019 (DE) ..................... 10 2019 206 980.0

(51) Int. Cl.
B62D 5/04 (2006.01)
B62D 6/08 (2006.01)

(52) U.S. Cl.
CPC ......... *B62D 5/0463* (2013.01); *B62D 5/0481* (2013.01); *B62D 6/08* (2013.01)

(58) Field of Classification Search
CPC ...... B62D 5/0463; B62D 5/0481; B62D 6/08; B62D 6/008; B62D 15/025
See application file for complete search history.

(56) References Cited

U.S. PATENT DOCUMENTS

| | | | |
|---|---|---|---|
| 4,992,944 A * | 2/1991 | Noto ..................... | B62D 5/0463 701/41 |
| 6,212,453 B1 * | 4/2001 | Kawagoe ............. | B62D 5/0463 701/28 |

(Continued)

FOREIGN PATENT DOCUMENTS

| | | | |
|---|---|---|---|
| CN | 107054448 A | 8/1917 | ............... B62D 5/04 |
| CN | 102762435 A * | 10/2012 | ........... B62D 5/0463 |

(Continued)

OTHER PUBLICATIONS

"Evaluation of a customizable haptic feedback system for ground vehicle steer-by-wire interfaces;" Mandhata et al.; 2012 American Control Conference (ACC) (pp. 2781-2787); Oct. 26, 2012. (Year: 2012).*

(Continued)

*Primary Examiner* — Khoi H Tran
*Assistant Examiner* — Jorge O Peche
(74) *Attorney, Agent, or Firm* — Slayden Grubert Beard PLLC

(57) ABSTRACT

The invention relates to a method for adjusting a servo steering torque in a vehicle steering system, wherein the servo steering torque can be generated by an actuator of the vehicle steering system. The method comprises: receiving a driver's steering request, receiving a steering request from at least one driver assistance system, receiving at least one driving dynamics variable, determining a static state in which a change of the driver's steering request and the driving dynamics variable each is below a predetermined threshold, and if the static state has been determined, adjusting the servo steering torque by regulating, wherein a control variable for the regulation is determined based on a driver's steering request and the steering request by the driver assistance system.

14 Claims, 3 Drawing Sheets

(56) References Cited

U.S. PATENT DOCUMENTS

| | | | |
|---|---|---|---|
| 6,901,320 B2 | 5/2005 | Yao et al. | 701/44 |
| 9,487,230 B2 | 11/2016 | Sakuma et al. | |
| 9,592,848 B1* | 3/2017 | Hirate | B62D 5/0463 |
| 9,815,491 B2* | 11/2017 | Aono | B62D 5/0466 |
| 10,099,720 B2 | 10/2018 | Ramanujam et al. | |
| 2001/0052756 A1* | 12/2001 | Noro | B62D 5/0484 |
| | | | 318/432 |
| 2004/0226770 A1* | 11/2004 | Nishiyama | B62D 5/0463 |
| | | | 180/446 |
| 2005/0061577 A1* | 3/2005 | Shimizu | B62D 5/0463 |
| | | | 180/446 |
| 2005/0288839 A1 | 12/2005 | Auer et al. | 701/41 |
| 2006/0069481 A1* | 3/2006 | Kubota | B62D 5/0463 |
| | | | 701/41 |
| 2008/0066994 A1* | 3/2008 | Fujita | B62D 5/0463 |
| | | | 701/43 |
| 2012/0303218 A1* | 11/2012 | Tamura | B62D 1/046 |
| | | | 701/41 |
| 2013/0110352 A1* | 5/2013 | Doi | B62D 6/02 |
| | | | 701/42 |
| 2013/0179037 A1* | 7/2013 | Ebihara | B62D 6/008 |
| | | | 701/41 |
| 2013/0226411 A1* | 8/2013 | Hirano | B62D 6/008 |
| | | | 701/42 |
| 2015/0057892 A1* | 2/2015 | Tamaizumi | B62D 6/008 |
| | | | 701/42 |
| 2015/0210318 A1* | 7/2015 | Takeda | B62D 6/008 |
| | | | 701/41 |
| 2015/0217801 A1* | 8/2015 | Takeda | B62D 5/0463 |
| | | | 701/42 |
| 2015/0225015 A1* | 8/2015 | Takeda | B62D 6/008 |
| | | | 701/41 |
| 2015/0246686 A1* | 9/2015 | Takeda | G06V 20/588 |
| | | | 701/41 |
| 2015/0246687 A1* | 9/2015 | Takeda | B62D 15/025 |
| | | | 701/41 |
| 2015/0266504 A1* | 9/2015 | Kunihiro | B62D 5/0466 |
| | | | 701/41 |
| 2015/0274206 A1* | 10/2015 | Takeda | B62D 6/008 |
| | | | 701/41 |
| 2015/0329142 A1* | 11/2015 | Takeda | B60R 1/00 |
| | | | 701/41 |
| 2015/0344068 A1* | 12/2015 | Taniguchi | B62D 15/025 |
| | | | 701/41 |
| 2015/0353127 A1* | 12/2015 | Takeda | B62D 5/0469 |
| | | | 701/41 |
| 2015/0375777 A1* | 12/2015 | Endo | B62D 5/0463 |
| | | | 701/41 |
| 2015/0375780 A1* | 12/2015 | Chai | B62D 6/002 |
| | | | 701/41 |
| 2016/0114832 A1* | 4/2016 | Taniguchi | B62D 6/04 |
| | | | 701/41 |
| 2018/0201306 A1* | 7/2018 | Tsubaki | B62D 6/00 |
| 2019/0039641 A1* | 2/2019 | Toda | B62D 6/008 |
| 2019/0071116 A1* | 3/2019 | Sasaki | B62D 5/049 |
| 2019/0084613 A1* | 3/2019 | Tsubaki | B62D 1/286 |
| 2019/0193782 A1* | 6/2019 | Tsubaki | B62D 6/02 |
| 2019/0263446 A1* | 8/2019 | Tsubaki | B62D 6/00 |
| 2019/0359247 A1* | 11/2019 | Tsubaki | B62D 1/286 |
| 2019/0367083 A1* | 12/2019 | Kodera | B62D 6/04 |
| 2020/0010111 A1* | 1/2020 | Tsubaki | B62D 6/007 |
| 2020/0156698 A1* | 5/2020 | Tsubaki | B62D 5/0463 |
| 2020/0298904 A1* | 9/2020 | Kitazume | B62D 5/0463 |
| 2020/0324812 A1* | 10/2020 | Matsuo | B62D 5/0463 |
| 2020/0361526 A1* | 11/2020 | Stoltze | B62D 5/0481 |
| 2021/0061344 A1* | 3/2021 | Kitazume | B62D 1/286 |
| 2021/0261190 A1* | 8/2021 | Toda | B62D 6/00 |
| 2021/0284226 A1* | 9/2021 | Kodera | B62D 5/0463 |
| 2021/0371010 A1* | 12/2021 | Kojo | B62D 6/10 |
| 2022/0009546 A1* | 1/2022 | Mori | B62D 5/0463 |
| 2022/0097760 A1* | 3/2022 | Mori | B62D 5/0463 |

FOREIGN PATENT DOCUMENTS

| | | | | |
|---|---|---|---|---|
| CN | 105599806 A | * | 5/2016 | B62D 5/0463 |
| CN | 107000785 A | * | 8/2017 | B62D 5/046 |
| CN | 107128355 A | * | 9/2017 | B62D 5/0409 |
| CN | 107161210 A | * | 9/2017 | B62D 5/0418 |
| CN | 108068882 A | * | 5/2018 | B62D 15/021 |
| CN | 106414219 B | * | 10/2018 | B62D 5/0463 |
| CN | 109070936 A | * | 12/2018 | B62D 5/0463 |
| CN | 110126914 A | * | 8/2019 | B62D 1/286 |
| CN | 108454694 B | * | 11/2020 | B60W 10/20 |
| CN | 111918803 A | * | 11/2020 | B60W 30/09 |
| CN | 108995645 B | * | 3/2021 | B60Q 9/008 |
| CN | 113460154 A | * | 10/2021 | B60W 10/20 |
| CN | 111315637 B | * | 3/2022 | B62D 5/0463 |
| CN | 109383502 B | * | 7/2022 | B60Q 1/34 |
| DE | 102014215243 A1 | | 2/1916 | B60W 30/12 |
| DE | 102017103034 A1 | | 8/1917 | B62D 5/04 |
| DE | 102017115850 A1 | | 1/1919 | B62D 5/04 |
| DE | 102004001764 A1 | | 8/2004 | B62D 5/00 |
| DE | 102004021951 A1 | | 12/2005 | B62D 5/04 |
| DE | 102004031259 A1 | | 1/2006 | B62D 5/00 |
| DE | 102008021848 A1 | | 11/2009 | B62D 5/04 |
| DE | 112014001750 T5 | | 12/2015 | B62D 5/04 |
| DE | 102016115662 A1 | * | 3/2017 | B62D 5/0463 |
| DE | 102019208395 A1 | * | 12/2020 | |
| DE | 112019001307 T5 | * | 12/2020 | B60W 30/09 |
| EP | 3178725 A1 | | 6/1917 | B62D 6/00 |
| EP | 2894079 A1 | * | 7/2015 | B62D 15/025 |
| EP | 2907729 A2 | * | 8/2015 | B62D 5/0463 |
| EP | 2921374 A2 | * | 9/2015 | B62D 5/0463 |
| EP | 2944544 A1 | * | 11/2015 | B62D 5/0466 |
| EP | 2944546 A1 | * | 11/2015 | B60R 1/00 |
| EP | 3705379 A1 | * | 9/2020 | B62D 15/021 |
| JP | 2017013579 A | * | 1/2017 | B62D 1/286 |
| JP | 2019131073 A | * | 8/2019 | B62D 3/12 |
| JP | 2019172239 A | * | 10/2019 | B60W 30/18163 |
| JP | 2020111194 A | * | 7/2020 | A63B 24/0087 |
| JP | 6753363 B2 | * | 9/2020 | B60R 1/00 |
| JP | 2021142891 A | * | 9/2021 | |
| JP | 2022128980 A | * | 9/2022 | B60W 30/09 |
| KR | 101534985 B1 | * | 7/2015 | |
| WO | 2008/116555 A1 | | 10/2008 | B62D 5/04 |
| WO | WO-2016027663 A1 | * | 2/2016 | B62D 15/021 |
| WO | WO-2016162902 A1 | * | 10/2016 | B60W 30/12 |
| WO | WO-2017175543 A1 | * | 10/2017 | B62D 5/0463 |
| WO | WO-2017213130 A1 | * | 12/2017 | B62D 1/286 |
| WO | WO-2018052036 A1 | * | 3/2018 | B62D 1/286 |
| WO | WO-2018088456 A1 | * | 5/2018 | B62D 1/286 |
| WO | WO-2018143408 A1 | * | 8/2018 | B62D 1/286 |
| WO | WO-2018168897 A1 | * | 9/2018 | B62D 1/286 |
| WO | WO-2019026895 A1 | * | 2/2019 | B62D 1/286 |
| WO | WO-2019082271 A1 | * | 5/2019 | B62D 5/0463 |

OTHER PUBLICATIONS

"A Vehicle Simulator for an Efficient Electronic and Electrical Architecture Design;" Chretien et al.; IEEE Transactions on Intelligent Transportation Systems (vol. 14, Issue: 4, pp. 1967-1982); Dec. 13, 2013. (Year: 2013).*

"Dual control theoretic driver assistance—Dynamic characteristics of steering torque control based on linear quadratic regulator;" Saito et al.; 2014 IEEE International Conference on Systems, Man, and Cybernetics (SMC) (pp. 1738-1743); Dec. 19, 2014. (Year: 2014).*

"Incentive shared trajectory control for highly-automated driving;" Judalet et al.; 2013 IEEE Intelligent Vehicles Symposium (IV) (pp. 1089-1094); Nov. 8, 2013. (Year: 2013).*

DE 102004001764 A1, US 6901320 B2.

DE 102004031259 A1, US 2005/0288839 A1.

DE 112014001750 T5, US 9487230 B2.

DE 102017103034 A1, US 10099720 B2.

German Office Action, Application No. 102019206980.0, 5 pages, dated Nov. 28, 2019.

* cited by examiner

METHOD AND STEERING CONTROL APPARATUS FOR DETERMINING A CORRECTING VARIABLE FOR ADJUSTING SERVO STEERING TORQUE IN A VEHICLE STEERING SYSTEM

CROSS-REFERENCE TO RELATED APPLICATIONS

This application claims priority to German Patent Application No. DE 10 2019 206 980.0, filed on May 14, 2019 with the German Patent and Trademark Office. The contents of the aforesaid Patent Application are incorporated herein for all purposes.

TECHNICAL FIELD

The invention relates to a method and a steering control apparatus for determining a control variable for adjusting servo steering torque in a vehicle steering system. The vehicle can be a motor vehicle and in particular a passenger car or truck. The vehicle steering system can be a servo steering system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern motor vehicles have an electric servomotor that generates an additional or exclusive (steer by wire) steering force for deflecting the vehicle wheels. Both versions are included in the invention. The steering force in this context is also termed servo steering torque and can alternatively also be termed steering assist torque.

In doing so, a driver's request for the steering angle is for example detected by means of a torque or angle of rotation sensor in a steering column, which is connected to a steering mechanism, and is transmitted to a steering control apparatus. The steering control apparatus then generates an actuating signal for a power electronics circuit which then generates corresponding control currents based thereupon for the electric motor (servomotor).

Driver assistance systems are known such as for example lane keeping systems that prevent the lane from being unintentionally left. These supply signals to the steering control apparatus that correspond to a steering request from the driver assistance system in order to also generate steering torque, and in particular driver-independent steering torque. In doing so, part of the steering torque requested by the driver assistance system is added to the input signal of the sensor which detects the driver's steering request, and a direct portion for the actuating signal is therefore also generated. This produces haptic feedback in the driver assistance system for the motor vehicle driver, depending on whether the steering request from the driver assistance system acts in the direction of the driver's steering request or in the opposite direction.

The steering request by the driver assistance system is frequently also termed offset torque, or such offset torque is generated based on this steering request (for example using speed-dependent characteristics). The term "offset" refers to the fact that a steering torque specified according to the driver's steering request is changed by the steering request from the driver assistance system, and an offset (i.e., a deviation) from the driver's steering request arises.

The goal in designing a vehicle steering system is frequently to enable a specific haptic feedback for the motor vehicle driver, at least in certain driving situations, even when a driver assistance system intervenes in steering. This is also termed adjusting a specific steering feel. In this case, it may be difficult to specifically adjust and predict the interaction between the driver's steering request and the offset torque. For example, the ultimately achieved haptic feedback for the motor vehicle driver also depends on the friction effects within the vehicle steering system. Friction can in particular occur between a rack and pinion driven by the servomotor that deflects the vehicle wheels upon being displaced.

It is known in particular to suitably adapt the offset torque in light of such friction effects (for example to modify its value according to a characteristic) in order to adjust a specific steering feel for the driver. This allows the friction effects to at least partially be compensated. However, this is restricted to sliding friction effects, which can be estimated precisely enough. The background in this regard can be found in DE 10 2004 021 951 A1. Such estimations and calculated compensations are not feasible with desired precision for conditions of static friction. An effect of static friction in vehicle steering systems is for example discussed in WO 08/116555 A1.

SUMMARY

An object of the present invention is to improve the adjustment of a specific steering feel for a motor vehicle driver even when driver assistance systems intervene in steering, such as in light of potential conditions of static friction.

The object is achieved by a method and an apparatus according to the independent claims. Embodiments of the invention are the discussed in the dependent claims and the following description.

It is noted that the aforementioned features, embodiments, and versions may also be provided in the solution according to the invention, or respectively can relate thereto.

In a first exemplary aspect, a method is provided for adjusting a servo steering torque in a vehicle steering system, wherein the servo steering torque can be generated by an actuator of the vehicle steering system. The method comprises: receiving a driver's steering request; receiving a steering request from at least one driver assistance system; receiving at least one driving dynamics variable; determining a static state in which a change of the driver's steering request and the driving dynamics variable each is below a predetermined threshold; and if the static state has been determined: adjusting the servo steering torque by regulating, wherein a control variable for the regulation is determined based on a driver's steering request and the steering request by the driver assistance system.

In another exemplary aspect, a steering control apparatus is provided for determining a control variable for adjusting a servo steering torque in a vehicle steering system, wherein the servo steering torque can be generated by an actuator of the vehicle steering system. The steering control apparatus receives the following: a driver's steering request; a steering request from at least one driver assistance system; and at least one driving dynamics variable. The steering control apparatus is configured to determine a static state in which a change of the driver's steering request and the driving dynamics variable each is below a predetermined threshold; and to ascertain, in a static state, a control variable for regulating the servo steering torque on the basis of a driver's steering request and the steering request from the driver assistance system.

The details of one or more embodiments are set forth in the accompanying drawings and the description below. Other features will be apparent from the description, drawings, and from the claims.

DETAILED DESCRIPTION

Figure 1:
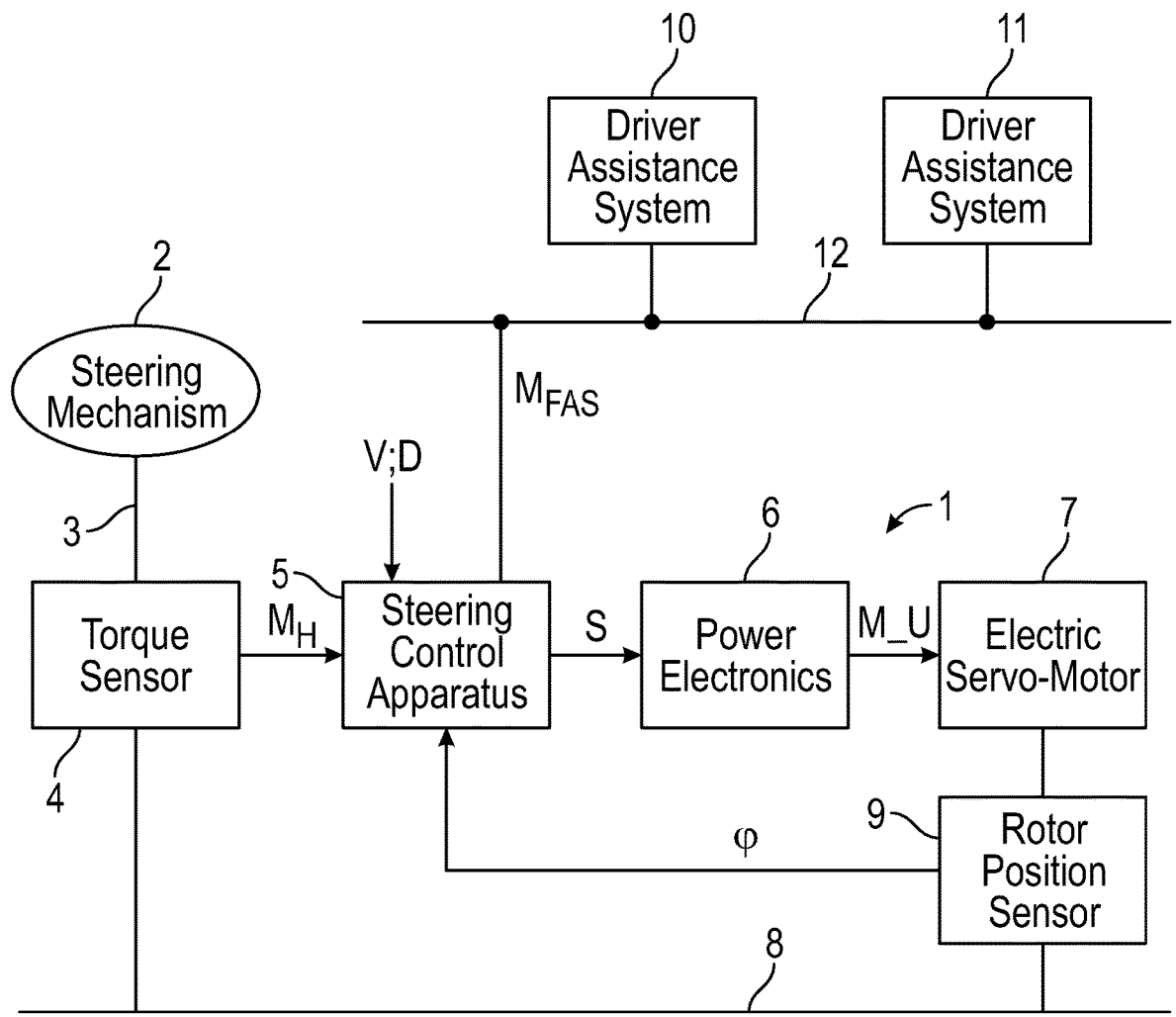
FIG. 1 shows an overview of a vehicle steering system that executes a method according to an embodiment and comprises a steering control apparatus according to an embodiment.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In general, a first exemplary aspect provides determining specific operating states of a vehicle steering system and, in situations in which predominant sliding friction exists, or respectively is probable, taking into account potential steering interventions by a driver assistance system in the context of regulation. It was found that in particular during an operating state in which constant driving dynamics as well as constant (driver) steering torque exist (for example while driving in a roundabout or driving through a long curve), applying a corresponding offset torque by a regulation to the vehicle steering system can lead to a natural steering feel from the perspective of the driver. In particular in this state, the offset torque can be offset with a manual torque currently applied by the driver, or respectively added thereto in order to adjust the resulting target steering torque by a regulation. The current driver's steering request can for example correspond to an initial driver's steering request upon the recognition of the static state, and/or saved as such.

In general, the driver's steering request can correspond to a manual steering torque detected by sensors, wherein it is possible for the determined driver's steering request (for example the corresponding sensor signal) to not be exclusively ascribable to forces generated by the driver, for example due to a mechanical coupling to a rack which can also be moved independent of the driver (for example by an actuator).

This procedure ensures that an offset torque by the driver assistance system can be applied without significant impairment of the steering feel, even though the influence of the static friction is mathematically difficult to compensate for, or respectively to take into account.

Contrastingly in other operating states in which a predominant static friction exists, or respectively is probable, a control can be provided that compensates for the sliding friction, for example mathematically, or respectively based on a model. The control can enable a more natural steering feel than a regulation if the latter would have to function on the basis of an actual variable that is only estimated or imprecisely measured.

Optionally, regulating and controlling can be switched depending on the existing operating state. In particular it can be provided that, according to the present aspect, a static state explained below and at least one of a first and second dynamic state are ascertainable. Depending on the determined state, regulating or controlling can be effectuated. The terms 'regulating' and 'regulation' in the present context is used interchangeably with closed-loop control.

Specifically, the present exemplary aspect relates to a method for adjusting a servo steering torque in a vehicle steering system, wherein the servo steering torque can be generated by an actuator (such as a servomotor) of the vehicle steering system, comprising:
  receiving a driver's steering request;
  receiving a steering request from at least one driver assistance system;
  receiving at least one driving dynamics variable;
  determining a static state in which a change of the driver's steering request and the driving dynamics variable each lie below a predetermined threshold;
and if the static state has been determined:
  adjusting the servo steering torque by regulating, wherein a control variable (also 'controlled variable' herein) for the regulation is determined based on a driver's steering request (such as a current, model-based, received and/or existing request when the static state is determined) and the steering request by the driver assistance system.

The driver's steering request may be manual torque in corresponding embodiments. This can be measured by means of sensors mentioned at the onset. The driver's steering request, or respectively the torque, can be determined in addition or alternatively, or also based on a model (i.e., calculated), for which, e.g., currently acting driving dynamics variables can be used, and/or a vehicle model (such as for example a conventional single track model) can be employed.

The steering request by the driver assistance system may be transmitted by a control device in corresponding embodiments. It may for example specify a magnitude of a desired offset torque, or respectively desired steering intervention torque.

The driving dynamics variable may for example be a yaw rate, a transverse acceleration, a vehicle speed, a steering position, a steering speed, and/or at least one wheel speed. These can be ascertained and/or determined based on a model using known sensors (such as from an ESP system).

The control variable can be a control variable for power electronics of the actuator in order for it to generate, or respectively effectuate the servo steering torque.

The threshold for recognizing the static state can be chosen so that it is (essentially) 0, i.e., the static state can correspond to an absent change of the mentioned variables.

If a static state has been recognized, which for example may be determined by a steering control apparatus explained below, the current driver's steering request can be saved. The steering request by the driver assistance system can then be offset with the saved driver's steering request (for example added taking into account the sign). For example, a target variable for controlling (such as a target torque and in particular target servo steering torque) can be determined as the variables, or respectively using the offset variables, in particular by addition as described. Then a regulation can be effectuated so that this target variable can actually be achieved. To accomplish this, for example a corresponding actual variable (for example an actual servo steering torque or actual driver's steering request) in the form of a control loop can be fed back so that the control variable can be continuously adapted based on existing control deviations.

In some embodiments, it can be provided that the current and/or saved driver's steering request is used as a reference for a driver's steering request without the intervention of the driver assistance system (i.e., it approximates the driver's steering request or is considered as a request that exists, or respectively would exist without the intervention of the driver assistance system).

For example, a difference may be formed between this reference and a driver's steering request measured after recognizing the static state and not necessarily saved, and the result of this may be used as an actual variable for regulating. For example, this difference can be used as, or respectively considered, a currently implemented actual steering request by the driver assistance system. For regulation, a rule deviation may then be formed between a maintained target and the present actual steering request by the driver assistance system. This rule deviation may, e.g., then be supplied to a (closed-loop) regulator that ascertains the control variable entirely or at least partially.

Another component of the control variable may optionally be determined in a conventional way by means of a steering assist function and/or steering system function, for example by controlling. This can for example determine a control variable for generating a steering assist torque by the actuator based on a current driver's steering request as well as received dynamic variables (e.g., the vehicle speed), and/or saved characteristics.

In this case, it has proven to be beneficial for a natural steering feel to occur in the recognized static state by introducing, or respectively adjusting the desired offset torque of the driver, and for the steering request by the driver assistance system to be implementable in a specific way. With dynamic states as will be explained below, it was contrastingly recognized that a corresponding regulation based on operating variables that potentially vary quickly can result in a less intuitive steering feel, which is why a control is favorable in that case.

Some embodiments provide that the method furthermore comprises the following:
  determining a first dynamic state in which a change of the driver's steering request and/or the driving dynamics variable lies above a predetermined threshold (that for example is again essentially 0),
and if the first dynamic state has been determined:
  adjusting the servo steering torque by controlling.

In some embodiments, this is done so that a control variable of the control is determined based on a driver's steering request, the steering request by the driver assist system, and a sliding friction variable.

The control can include determining a target variable (for example a target servo steering torque or a (target) overall steering request) using the driver's steering request, the steering request from the driver assistance system, and may be for example the sliding friction variable as well. On this basis, the control variable can then be determined to implement this target variable in corresponding embodiments. However, feeding back an actual variable (for example an actual servo steering torque) may be omitted in this case.

The sliding friction variable may be determined in a known manner using previously saved tables, functions and/or characteristics. By taking into account the sliding friction variable, sliding friction effects can be at least partially (mathematically) compensated, for example because one of the other variables, or the determined target and or control variable, can then be suitably raised or lowered in order to overcome a sliding friction component so that this does not undesirably distort a steering feel.

In other embodiments, the method furthermore comprises:
  determining a second dynamic state in which a change of the driver's steering request lies below a predetermined threshold (that for example is essentially 0), and the driving dynamics variable lies above a predetermined threshold (that for example is essentially 0). For example in this case, the steering position can therefore remain constant, or at least nearly constant (i.e., a steering speed (of the steering mechanism) can be 0), however driving vehicle movements and/or dynamic vehicle forces can occur.

These embodiments furthermore provide that if the second dynamic state exists, the following is carried out:
  adjustment of the servo steering torque by a control, wherein a control variable of the control is determined based on a driver's steering request, the steering request by the driver assistance system, and a friction variable (such as a sliding friction variable).

It has been shown that in this case, despite probably dominant static friction given a lack of a change in the driver's steering request, a control can lead to a natural steering feel since haptic feedback due to the driving dynamics, or respectively the surface driven on is not as it were unintentionally, or respectively accidentally regulated as a result of a regulation.

Some embodiments provide that if the servo steering torque is adjusted by regulating, there is a switch to controlling the servo steering torque. This can for example be the case if a regulation difference within regulating becomes zero. Consequently, the benefits of controlling after overcoming the friction can be brought to bear as quickly as possible. In principle, the control can then be executed according to any of the variations described herein.

In some embodiments, it can be provided in this context that the servo steering torque is controlled taking into account a static friction variable, wherein the static friction variable is determined using a regulation deviation in the regulation of the servo steering torque. The regulation deviation can be determined as the difference between a target servo steering torque specified in the context of regulating and a received actual servo steering torque.

In general, any regulation described herein can be performed at least until the static state no longer exists, and/or until one of the first or second dynamic states exist.

Some embodiments provide that the static friction variable determined according to one of the above versions is saved, and a plurality of saved static friction variables is evaluated for fault recognition. Expressed otherwise, values of the static friction variable can be recorded continuously, and/or over the life of the vehicle, and/or during an operation of the vehicle. If the static friction variable decreases unexpectedly or strongly increases unexpectedly (or respectively if the static friction variable meets a predetermined critical variation criterion), it can be inferred that a fault exists in the steering system. This fault can then be compensated by adapting for example the control, and/or warnings can be output.

In some embodiments, the driver's steering request is determined based on a model. For example, the driver's steering request that the driver would apply without the intervention of driver assistance is determined based on a model. This can be provided in addition or alternatively to capturing the driver's steering request by measuring. For example, a difference can be formed between this variable determined based on a model and the driver's steering request determined by measuring. This difference can be used as an actual variable of regulating, for example as an implemented actual steering request, or respectively an actual offset of the driver assistance system.

As mentioned in the preceding, it can also be provided that the dynamics variable is determined based on a model.

Conventional approaches such as for example the single track model, multitrack model or tooth load observer are possible as the model in each of the above cases. These may also access dynamics variables described herein as input variables.

The invention in a second exemplary aspect also relates to a (for example digital and/or electronic) steering control apparatus (for example comprising at least one processor apparatus) for determining a control variable for adjusting a servo steering torque in a vehicle steering system, wherein the servo steering torque can be generated by an actuator of the vehicle steering system,
wherein the steering control apparatus receives the following:
  a driver's steering request;
  a steering request from at least one driver assistance system;
  at least one driving dynamics variable; and
  wherein the steering control apparatus is configured to determine a static state in which a change of the driver's steering request and the driving dynamics variable always lies below a predetermined threshold; and,
  when the static state exists, to determine a control variable for regulating the servo steering torque on the basis of a driver's steering request and the steering request from the driver assistance system.

The steering control apparatus may for example comprise all additional features and versions in order to provide all of the steps, effects, operating states and interactions described herein. For example, the steering control apparatus may be configured to execute the method according to the first aspect or any combination of embodiments described herein. All of the above-explained embodiments of the features of the method may also be provided for the identical features of the steering control apparatus, or respectively applied thereto.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Components/steps of the same type or with the same effect may be provided with the same reference numbers.

BRIEF DESCRIPTION

FIG. 1 schematically portrays a vehicle steering system 1 of a motor vehicle that has a steering mechanism 2 which is connected to an input shaft 3. A torque sensor 4 is arranged on the input shaft 3 that detects a driver's steering request in the form of manual torque $M_H$ on the steering mechanism 2.

Moreover, the vehicle steering system 1 has a steering control apparatus 5, a power electronics 6, an electric servomotor (actuator) 7 and a rack 8. The servomotor 7 has a rotor position sensor 9, from whose signals the position of the rack 8 and therefore the steering angle can be inferred.

The signals from the torque sensor 4 and the signals from the driver assistance systems 10, 11 which indicate a steering request $M_{FAS}$ from these driver assistance systems 10, 11 are fed to the steering control apparatus 5. The driver assistance systems 10, 11 and steering control apparatus 5 are connected to each other by a bus system 12. Moreover, the steering control apparatus 5 also obtains at least the vehicle speed V as the driving dynamics variable D (or any other of the aforementioned driving dynamics variables D) from a sensor or controller (not shown).

Depending on the input variables $M_H$, V and the steering request $M_{FAS}$ from the driver assistance systems 10, 11, the steering control apparatus 5 generates a control variable in the form of an actuating signal S for the power electronics 6 that then correspondingly energizes the servomotor 7 so that it can move the rack 8 by the servo steering torque M_U. In this case, the servomotor 7 can be connected to the rack 8 by a gear unit (not shown). The conversion of the servo steering torque M_U into a rack movement is in principle associated with friction. The rotor position sensor 9 supplies a rotor angle φ, by means of which the position of the rack 8 can be determined based on the known transmission ratio. It is also noted that the input shaft 3 is mechanically engaged with the rack 8, and the actuator 7 functions as a steering support actuator. A torque generated by the actuator 7 therefore also affects the steering mechanism 2, the input shaft 3, as well as the measuring signals of the torque sensor 4.

In the following, the generation of the control variable S in various operating states, and in particular various friction states, will be further explained with reference to FIGS. 2 and 3. These figures each show the signal processing within the steering control apparatus 5 that is only symbolized and which is executed, or respectively calculated in a known manner using program instructions.

Figure 2:
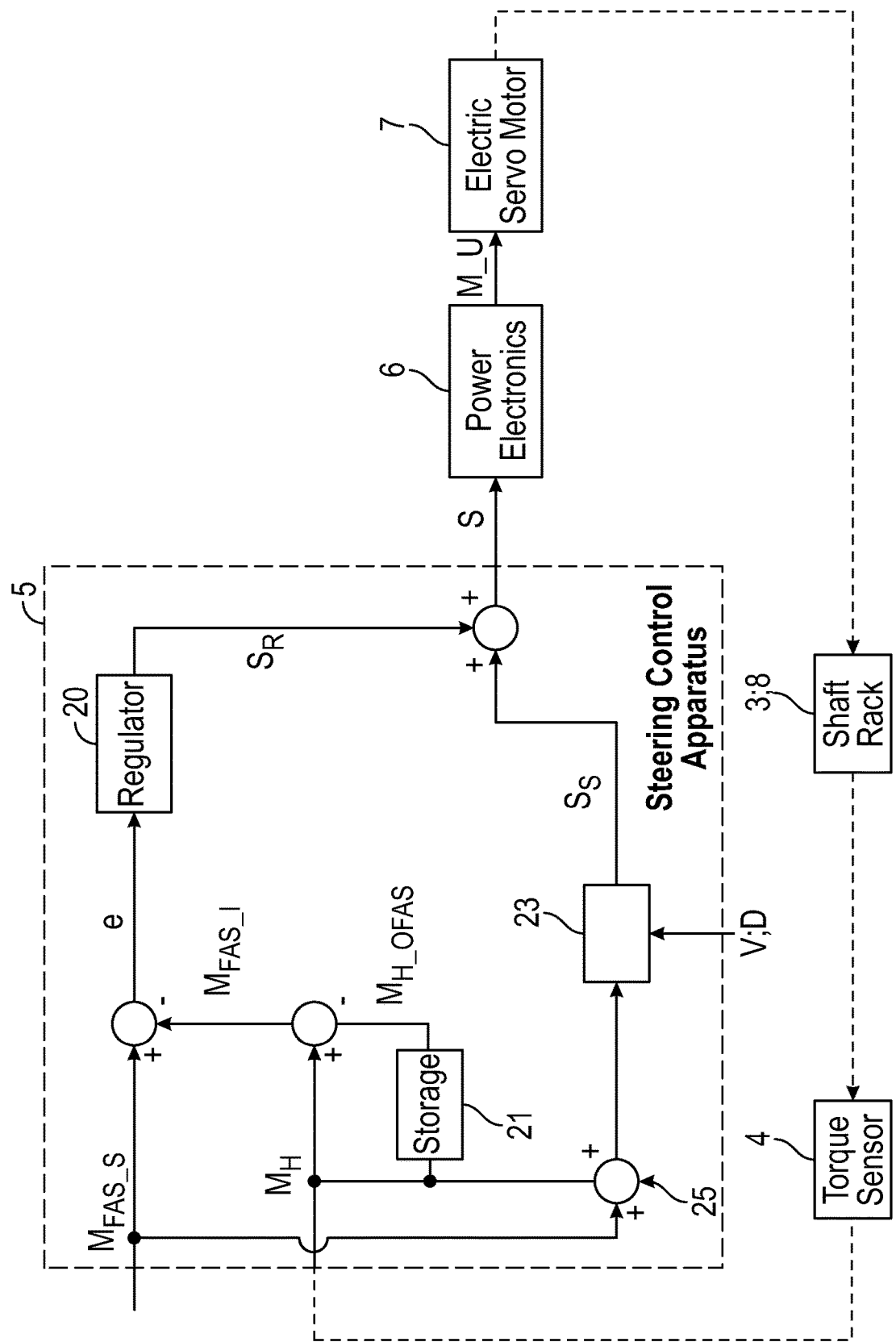
FIG. 2 shows a schematic representation of a regulation that can be executed using the method according to an embodiment.

In FIG. 2, the presence of a static state has been determined by the steering control apparatus 5. This is distinguished in that the original driver's steering request $M_H$ (such as the envisioned steering position and/or steering speed) does not change, and neither do the dynamics variables D (for example the driving speed V). It is for example determined that the steering speed is approaching zero or is zero. In the static case, the servo steering torque M_U, or stated more precisely, the control variable S on the basis of which the servo steering torque M_U is generated, is adjusted by the steering control apparatus 5 by regulating. The signal flows shown in FIG. 2 pertain to this regulation.

This shows that the target steering request $M_{FAS\_S}$ from the driver assistance systems (target offset torque) 10, 11 is received as a target variable to be adjusted. This corresponds to the general steering request $M_{FAS}$ from the driver assistance systems 10, 11 in FIG. 1. Furthermore, the current implemented actual steering request $M_{FAS\_I}$ from the driver assistance system 10, 11 is determined. In the shown static case, the manual steering torque $M_H$ is used as the basis for determining the corresponding actual variable.

Stated more precisely, the manual steering torque $M_{H\_OFAS}$ which existed during recognition and consequently at the beginning of the static state is saved in a storage apparatus 21 and then used as a reference for adjusting the target steering request $M_{FAS\_S}$ from the driver assistance systems 10, 11. The saved manual steering torque $M_{H\_OFAS}$ corresponds to the manual steering torque $M_H$ without the intervention of the driver assistance systems 10, 11. This is subtracted from a current manual steering torque $M_H$, wherein the obtained difference corresponds to the actual steering request $M_{FAS\_I}$ from the driver assistance system 10, 11 (i.e., the actual offset in the steering mechanism 2). Accordingly, the manual steering torque $M_H$ and in particular the saved manual steering torque $M_{H\_OFAS}$, or respectively a difference between these variables provides a reference for determining the extent to which the target steering request $M_{FAS\_S}$ from the driver assistance system 10, 11 has already been implemented (i.e., adjusted).

As furthermore shown in FIG. 2, a regulation deviation "e" is calculated from the target and actual steering request $M_{FAS\_S}$, $M_{FAS\_I}$ from the driver assistance systems 10, 11 and fed to a regulator 20. This then outputs an amount $S_R$ of the control variable S for adjusting the target steering request $M_{FAS\_S}$ from the driver assistance systems 10, 11.

In an embodiment, another component of the control variable $S_s$ is determined to provide basic steering system functions. In the shown example, this is achieved by means of a control function 23 that could also be termed a steering system function (and/or steering force support function). This control function 23 receives for example the current driver's steering request $M_H$ and e.g. the dynamics variables V, D as well in order, by using the received variables, to then determine the corresponding control variable $S_s$ in a known manner and for example by a speed-dependent characteristic.

Optionally, a pilot control may also be provided in which the target steering request $M_{FAS\_S}$ from the driver assistance system 10, 11 and the driver's steering request $M_H$ are added and fed to the control function 23. The optional summation node 25 and the associated signal flow focus thereupon.

The portrayed solution is distinguished in this context in particular by the step of recognizing the static state and then activating the described regulation in order to then determine the control variable S for adjusting the servo steering torque M_U. Moreover, the solution is distinguished in that the regulation is based on the (current) driver's steering request $M_H$ present in the static state and, stated more precisely, is saved as the initially existing (current) driver's steering request $M_{H\_OFAS}$. The (target) steering request $M_{FAS}$ from the driver assistance system 10, 11 is as it were adjusted, or respectively taken into account by regulating when generating the servo steering torque M_U.

Another signal flow indicated with a dashed line in FIG. 2 relates to the at least indirect feedback of the servo steering torque M_U adjusted by the control variable S. Stated more precisely, this affects the torque sensor 4 through the steering components from FIG. 1 and in particular the rack 8 and input shaft 3, from whose measuring signals the manual steering torque $M_H$ is determined. Since the actual variable $M_{FAS\_I}$ is then determined based on this, a closed control loop results.

It should be noted that the corresponding feedback may be for example activated only after saving the current manual steering torque $M_H$ as the variable $M_{H\_OFAS}$ upon recognizing the static state.

Alternatively, it can be provided that the manual steering torque $M_{H\_OFAS}$ without the intervention of the driver assistance system 10, 11 is determined based on a model instead of saving by means of a storage apparatus 21. In this case, a model block could be added instead of the storage apparatus 21 in FIG. 2 which is then also not necessarily linked to the manual steering torque $M_H$ at the input side, but rather, at the output side, outputs the manual steering torque $M_{H\_OFAS}$ correspondingly determined based on a model to the associated difference node from FIG. 2.

Figure 3:
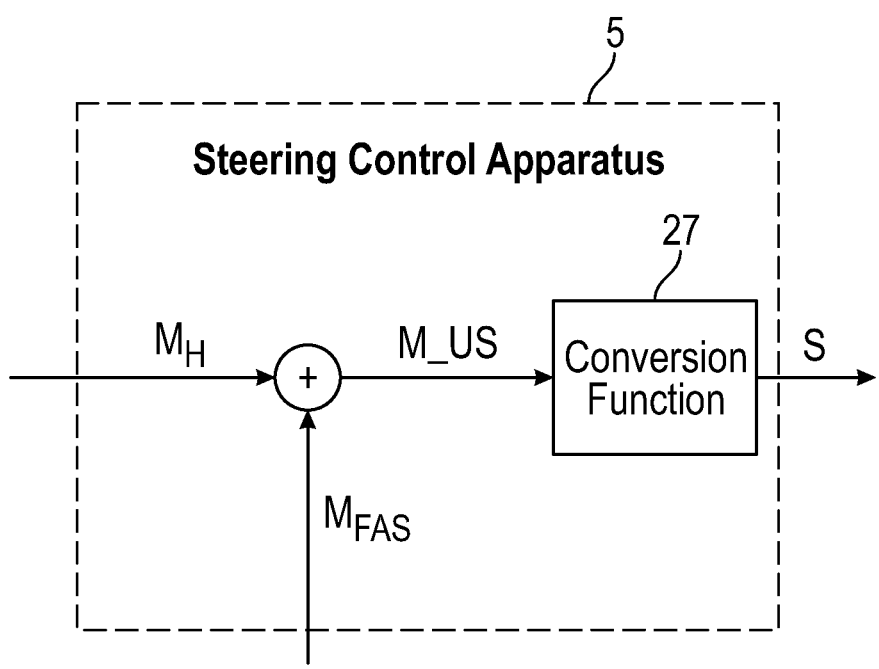
FIG. 3 shows a schematic representation of a control that can be executed using the method according to an embodiment.

A version is shown in FIG. 3 in which the steering control apparatus 5 undertakes a control of the control variable S instead of a regulation to adjust an overall target steering request M_US which is composed of the manual steering torque $M_H$ and the steering request $M_{FAS}$ from the driver assistance systems 10, 11. Such a control is then undertaken when the first or second dynamic state is recognized by the steering control apparatus 5 according to the above general description.

By means of a conversion function 27 that for example is a component of the control algorithm (and in any other way as well), for example a friction state may be taken into account in this case. To accomplish this, a sliding friction variable is estimated using conventional solutions, and the control variable S is appropriately adapted in order to compensate for the sliding friction variable.

Consequently, the steering control apparatus 5 can therefore optionally either execute the regulation from FIG. 2 or the control from FIG. 3 in order to take into account the steering request $M_{FAS}$ from a driver assistance system 10, 11 depending on which of the static or dynamic states currently exists. As discussed above in the general section, a desired steering feel can thereby be achieved, and friction effects including an application of the steering request $M_{FAS}$ from a driver assistance system 10, 11 can also be taken into account with sufficient precision.

The invention is not restricted to the portrayed exemplary embodiments, nor in particular to their individual details and features. Further embodiments and versions have been explained above in the general descriptive section.

For example, it can also be provided that once the regulation deviation "e" from FIG. 2 becomes zero, and for example if the static state still exists, a switch to a control can occur. To compensate for friction, the previously adjusted control variable SR is then saved. This can be taken into account as a static friction variable and mathematically compensated for (such as by correspondingly increasing the servo steering torque M_U by the amount of this static friction variable in the event of an opposite +/− sign). This can be implemented using the conversion function 27 from FIG. 3.

LIST OF REFERENCE NUMBERS

1 Vehicle steering system
2 Steering mechanism
3 Input shaft
4 Torque sensor
5 Steering control apparatus
6 Power electronics
7 (actuator)
8 Rack
9 Rotor position sensor
10, 11 Driver assistance systems
12 Bus system
20 Regulator
21 Storage apparatus 23 Control function
27 Conversion function
V Vehicle speed
D Driving dynamics variable
S Correcting variable
M_U Servo steering torque
M_US Overall target steering request
$M_H$ Driver's steering request (manual torque)
$M_{FAS}$ Steering request from driver assistance systems
e Regulation deviation The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

The invention claimed is:

1. A method for adjusting a servo steering torque in a vehicle steering system, wherein the servo steering torque is generated by an actuator of the vehicle steering system, the method including:
    receiving a driver's steering request;
    receiving a steering request from at least one driver assistance system, external to a steering control apparatus of the vehicle;
    receiving at least one driving dynamics variable;
    determining a static state in which a change of the driver's steering request and the driving dynamics variable each is below a predetermined threshold; and
    if the static state has been determined:
        adjusting the servo steering torque by closed-loop control, wherein a control variable for the closed-loop control is determined based on a driver's steering request and the steering request by the driver assistance system.

2. The method of claim 1, furthermore comprising:
    determining a first dynamic state in which a change of the received driver's steering request and the driving dynamics variable is above a predetermined threshold, and if the first dynamic state has been determined:
    adjusting the servo steering torque by controlling.

3. The method of claim 2, wherein a control variable of the control is determined based on a driver's steering request, the steering request by the driver assistance system, and a sliding friction variable.

4. The method of claim 3, furthermore comprising:
    determining a second dynamic state in which one or more of a change of the received driver's steering request and a steering speed is below a predetermined threshold, and the driving dynamics variable is above a predetermined threshold, and if the second dynamic state is determined:
        adjusting the servo steering torque by controlling, wherein a control variable for the control is determined based on a driver's steering request, the steering request by the driver assistance system, and a friction variable.

5. The method of claim 2, furthermore comprising:
    determining a second dynamic state in which one or more of a change of the received driver's steering request and a steering speed is below a predetermined threshold, and the driving dynamics variable is above a predetermined threshold, and if the second dynamic state is determined:
        adjusting the servo steering torque by controlling, wherein a control variable for the control is determined based on a driver's steering request, the steering request by the driver assistance system, and a friction variable.

6. The method of claim 1, furthermore comprising:
    determining a second dynamic state in which one or more of a change of the received driver's steering request and a steering speed is below a predetermined threshold, and the driving dynamics variable is above a predetermined threshold, and if the second dynamic state is determined:
        adjusting the servo steering torque by controlling, wherein a control variable for the control is determined based on a driver's steering request, the steering request by the driver assistance system, and a friction variable.

7. The method of claim 1, wherein when the servo steering torque is adjusted by regulating, it is switched to controlling the servo steering torque.

8. The method of claim 7, wherein the servo steering torque is controlled taking into account a static friction variable, wherein the static friction variable is determined using a closed-loop control deviation in the closed-loop control of the servo steering torque.

9. The method of claim 8, wherein the closed-loop control deviation is determined as the difference between a target servo steering torque specified in the context of regulating and a received actual servo steering torque.

10. The method of claim 8, wherein the static friction variable is saved, and a plurality of saved static friction variables is evaluated for fault recognition.

11. The method of claim 9, wherein the static friction variable is saved, and a plurality of saved static friction variables is evaluated for fault recognition.

12. The method of claim 1, wherein for the closed-loop control, one or more of the driver's steering request and a driver's steering request without the intervention of the driver assistance system is determined based on a model.

13. The method of claim 1, wherein the dynamics variable is determined based on a model.

14. A steering control apparatus for determining a control variable for adjusting a servo steering torque in a vehicle steering system, wherein the servo steering torque is generated by an actuator of the vehicle steering system, wherein the steering control apparatus receives:
    a driver's steering request;
    a steering request from at least one driver assistance system, external to the steering control apparatus of the vehicle;
    at least one driving dynamics variable;
        wherein the steering control apparatus is configured to determine a static state in which a change of the driver's steering request and the driving dynamics variable each is below a predetermined threshold; and to ascertain, in a static state, a control variable for closed-loop control of the servo steering torque on the basis of a driver's steering request and the steering request from the driver assistance system.

* * * * *